(No Model.) H. S. VAN PATTEN. 2 Sheets—Sheet 1.
VEHICLE.
No. 505,563. Patented Sept. 26, 1893.
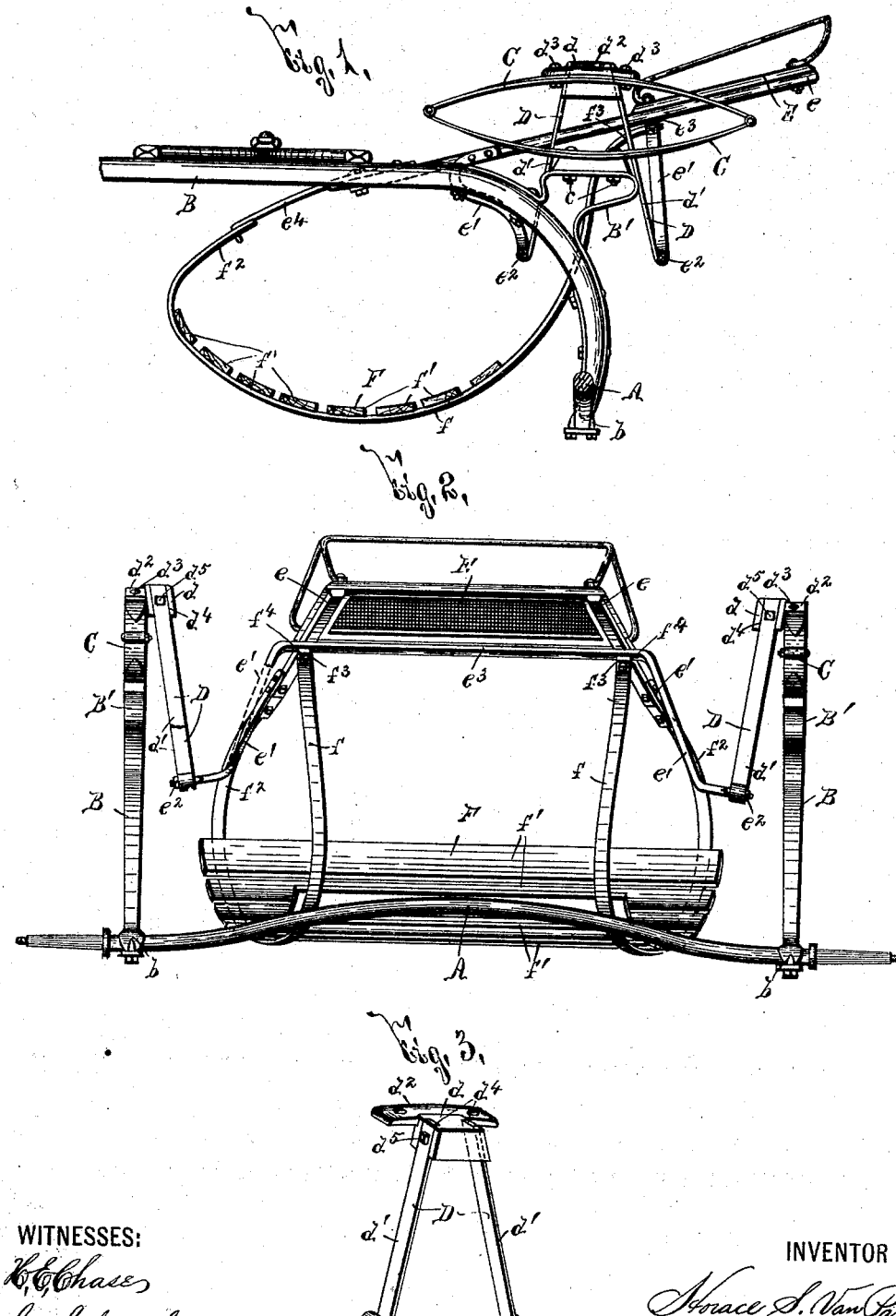
WITNESSES:
H. E. Chase
C. Schenck.
INVENTOR
Horace S. Van Patten
BY
Wilkinson Paisens
ATTORNEYS.

(No Model.) 2 Sheets—Sheet 2.
H. S. VAN PATTEN.
VEHICLE.
No. 505,563. Patented Sept. 26, 1893.
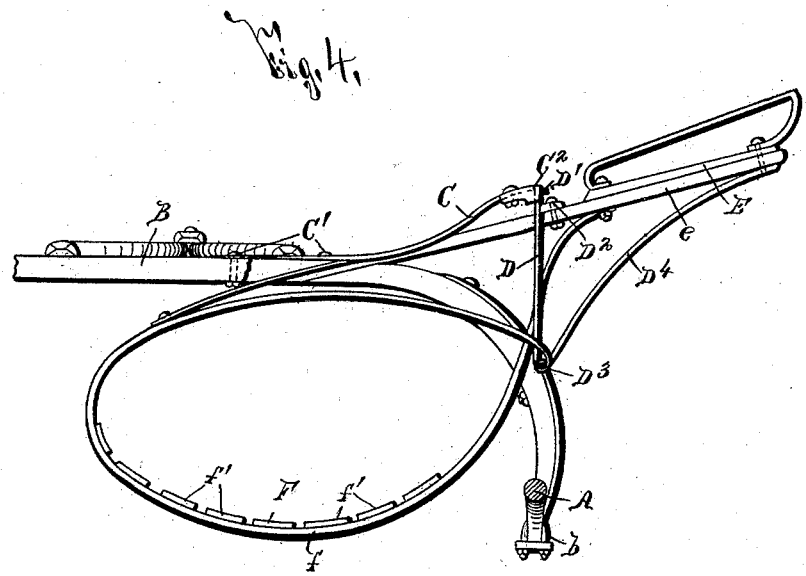
WITNESSES:
INVENTOR
Horace S. Van Patten
BY
ATTORNEYS.

UNITED STATES PATENT OFFICE.

HORACE S. VAN PATTEN, OF MANLIUS, NEW YORK.

VEHICLE.

SPECIFICATION forming part of Letters Patent No. 505,563, dated September 26, 1893.

Application filed November 12, 1892. Serial No. 451,724. (No model.)

*To all whom it may concern:*

Be it known that I, HORACE S. VAN PATTEN, of Manlius, in the county of Onondaga, in the State of New York, have invented new and useful Improvements in Vehicles, of which the following, taken in connection with the accompanying drawings, is a full, clear, and exact description.

My invention relates to improvements in vehicles and has for its object the production of a simple, practical and effective cart in which the rider is supported by springs of great flexibility, having an easy and natural movement and so constructed and supported as to reduce to a minimum the horse motion heretofore experienced, to a greater or less extent in vehicles of this class, and to this end it consists, essentially, in longitudinal side springs, hanger springs having their upper ends supported upon the side springs, and their lower ends provided with separated spring arms movable forwardly and rearwardly beyond their normal position, a seat extending rearwardly beyond said spring arms and provided with supporting bars mounted upon said arms, and a foot-rest extending forwardly of said spring arms and supported upon the seat supporting bars.

The invention furthermore consists in the detail construction and arrangement of the parts, all as hereinafter more particularly described and pointed out in the claims.

In describing this invention, reference is had to the accompanying drawings, forming a part of this specification, in which, like letters indicate corresponding parts in all the views.

Figure 1 is an elevation of the detached axle, the rear ends of the shafts, and the body of my improved cart. Fig. 2 is a rear elevation of the parts as shown at Fig. 1. Fig. 3 is an isometric perspective of one of the detached hanger springs; and Fig. 4 is an elevation of a modified form of my invention.

As is well known, the rider of a cart is more or less subjected to horse motion, although various carts have been produced for reducing this motion. My present invention is a simple, practical and effective construction which reduces this horse motion to a minimum and yieldingly supports the occupant, in such a manner that the strain upon the cart, the weight and leverage upon the horse, and the amount of jar usually transmitted to the rider when passing over a rough road way are reduced to a minimum.

—A— is the axle which is of any desirable form, size and construction and —B—B— are the shafts suitably secured to the axle —A— as by clips —$b$—$b$—. Suitably supported upon the shafts —B—B— are side springs —C—C— which extend longitudinally in planes substantially parallel with the line of draft. At Figs. 1 and 2, these side springs are shown as ordinary elliptical springs and as secured by rivets —$c$—$c$— to arms or seats —B'—B'— upon the shafts —B—B—.

—D—D— are hanger springs which are supported at their upper ends upon the side springs —C—C— and are slightly inclined inwardly from their upper ends in order that they may move freely without rubbing against said side springs. At Figs. 1, 2 and 3, the hanger springs —D—D— are shown as consisting of a central rigid portion or bar —$d$— and depending spring arms —$d'$—$d'$— having their lower ends separated a greater distance than their upper extremities.

As preferably constructed the portions or bars —$d$—$d$— of the hanger springs —D—D— are formed at the upper edges of their outer faces with flanges or saddles —$d^2$—$d^2$— mounted upon the corresponding side springs —C—C— and secured thereto by rivets or other suitable securing means —$d^3$—. The spring arms —$d'$—$d'$— of each hanger spring —D— are for the purpose of cheapening their manufacture and facilitating their replacement at slight expense, preferably formed separable from each other and their upper ends are registered with grooves —$d^4$— $d^4$— formed in the front and rear faces of the bar —$d$— and secured in operative position by a bolt or other clamp —$d^5$— passed through said arms —$d'$—$d'$— and the bar —$d$—.

Upon reference to Fig. 1, it will be readily noted that the side springs —C—C— and the hanger springs —D—D— are so relatively arranged and supported that the bar —$d$— of the hanger springs is directly above the axle —A— and the spring arms —$d'$—$d'$— on opposite sides of the vertical plane of said axle. As will be immediately described, the seat and the foot-rest are supported upon the lower ends of the spring arms of the hanger springs, and consequently, as the points of support of said seat and foot-rest are on opposite sides of the axle, said parts yield easily with a minimum amount of movement and reduce to a minimum the strain upon the cart, the leverage and weight upon the horse.

—E— is the seat which is of any desirable form, size and construction, and extends rearwardly beyond the hanger springs —D—D— and —e—e— are seat supporting bars having their rear ends suitably secured to the seat —E— and their front ends extended forwardly beyond said hanger springs —D—D—. Formed or provided upon the seat supporting bars —e—e— are depending lugs or arms —e'—e'— having their lower ends hinged at —$e^2$—$e^2$— to the lower ends of the spring arms —d'—d'— of the hanger springs —D—D—. As is best seen at Fig. 2, the rear lugs or arms —e'—e'— are connected together by a cross bar —$e^3$— formed integral therewith and acts as a tie for said arms and the rear ends of the seat supporting bars.

—F— is the foot-rest which is of any desirable form, size and construction being here illustrated as consisting of longitudinal curved bars —f—f—, and cross slats —f'—. The front ends —$f^2$—$f^2$— of the bars —f—f— are bent rearwardly and are suitably secured to forwardly extending spring arms —$e^4$—$e^4$— upon the spring supporting bars —e—e—. The rear ends —$f^3$—$f^3$— of the longitudinal bars —f—f— of the foot-rest —F— are extended upwardly and are secured to the seat supporting bars —e—e— by the bolts —$f^4$—$f^4$— for securing the rear arms —e'—e'— to said seat supporting bars.

As is evident from the foregoing, the seat and foot-rest are secured together, and form essentially a single support for the rider hinged to a pair of separated spring arms and as the seat and the foot-rest extend, respectively, backwardly and forwardly beyond their points of support, the rider is entirely supported on an essentially hinged support, extending on opposite sides of the axle and free to rock either forwardly or backwardly upon the spring arms —d'—d'— and the side springs —C—C—. This is a particularly easy form of yielding support for the rider and practical experience demonstrates that the horse motion is reduced to a minimum as is evident to one skilled in the art, since the side springs —C—C— move up and down freely and the hanger springs —D—D— move forwardly and rearwardly beyond their normal position, causing the rider to move or rock in substantially the same manner as though supported in a rocking chair or a swinging hammock. Moreover, as previously stated, the amount of movement of the rider and the weight and leverage upon the horse are also reduced to a minimum.

At Fig. 4 I have shown a modified form of my invention, in which, the side springs —C—C— consist of spring bars having their forward ends secured at —C'— to the shafts —B— and their rear ends extended upwardly above the axle —A— and provided with attaching ends —$C^2$—. In this figure, the hanger springs —D— are shown as consisting of spring bars having their upper ends secured at —D'— to the attaching ends —$C^2$— and their lower ends as arranged directly above the axle —A—. The separated points of support —$D^2$—$D^3$— of this form of hanger spring are arranged one above the other, the seat supporting bars —e— are suitably secured directly to the upper points of support —$D^2$— and are provided at their rear ends with forwardly inclining arms —$D^4$— secured to the lower points of support —$D^3$—.

My invention is simple in construction, practical in operation, durable and efficient in use, and reduces to a minimum the horse motion heretofore incidental in the use of carts of this construction. It is evident, however, that its detail construction and arrangement may be somewhat changed without departing from the spirit of my invention, hence I do not herein limit myself to such detail construction and arrangement.

Having thus fully described my invention, what I claim as new, and desire to secure by Letters Patent, is—

1. In a cart, the combination of substantially vertical or upright springs as D—D movable forwardly and rearwardly beyond their normal position in planes substantially parallel with the line of draft, a seat supported on said springs and extending rearwardly beyond its point of support, and a foot-rest supported on said springs and extending forwardly beyond its point of support, substantially as and for the purpose set forth.

2. In a cart, the combination of substantially vertical springs movable forwardly and rearwardly beyond their normal position in planes substantially parallel with the line of draft and each provided with separated points of support, a seat, connected substantially as described, to said points of support, and a foot-rest connected substantially as described, to said points of support, substantially as and for the purpose specified.

3. In a cart, the combination with springs; of a pair of hanger springs having their corresponding ends supported on the springs, a seat supported upon the hangers and extending rearwardly beyond its point of support, and a foot-rest supported upon said hanger springs and extending forwardly beyond its point of support, substantially as and for, the purpose set forth.

4. In a cart seat, the combination with side springs movable up and down; of hanger springs having corresponding ends supported on the side springs, and their opposite ends movable forwardly and rearwardly of their normal position, a seat supported upon the hanger springs and extending rearwardly beyond its point of support, and a foot-rest supported upon said hanger springs and extending forwardly beyond its point of support, substantially as and for the purpose specified.

5. In a cart, the combination with an axle and shafts; of elliptical side springs, a pair of hanger springs having corresponding ends supported on the elliptical side springs, a seat supported upon the hanger springs and extending rearwardly beyond its point of support, and a foot-rest supported upon said hanger springs and extending forwardly from its point of support, substantially as and for the purpose set forth.

6. In a cart, the combination with a spring; of a hanger spring having its upper end secured to the spring and its lower end formed with separated spring arms, a seat extending rearwardly beyond the rear arm of the hanger spring and seat supporting bars provided with arms hinged to the ends of the spring arms of the hanger, substantially as and for the purpose specified.

7. In a cart, the combination of a pair of side springs; of a pair of substantially vertical or upright hanger spring arms supported upon each of the side springs, said hanger spring arms having their upper ends connected, substantially as described, to the side springs and having their lower ends separated a greater distance than their upper ends, and a seat connected, substantially as described, to said spring arms, substantially as set forth.

8. In a cart, the combination with an axle and shafts; of springs movable forwardly and rearwardly beyond their normal position in planes substantially parallel with the line of draft and provided with separated arms having their attaching ends arranged on opposite sides of the vertical plane of the axle, a seat supported upon said ends of the arms, and a foot-rest supported upon said ends of the spring arms, substantially as and for the purpose set forth.

9. In a cart, the combination with a spring; of a hanger spring having its upper end secured to the spring and its lower end formed with separated spring arms, a seat extending rearwardly beyond the rear spring arms of the hanger spring, seat supporting bars provided with arms hinged to the ends of the spring arms of the hanger spring, and a foot-rest secured to the seat supporting bars at a point in advance of the forward arm of the hanger spring and secured to said supporting bars at a point at the rear of the forward arm of the hanger spring, substantially as and for the purpose set forth.

10. In a cart, the combination with a pair of springs extending in planes substantially parallel with the line of draft; of a pair of hanger springs inclining inwardly from their upper ends and having their upper ends supported upon said side springs, a seat provided with supporting bars, mounted upon said hanger springs and extended rearwardly beyond the points of support of said bars, and a foot-rest extending forwardly of the points of support of the seat supporting bars, and secured to said seat supporting bars, substantially as and for the purpose specified.

11. In a cart, the combination with a pair of elliptical side springs extending longitudinally in planes substantially parallel with the line of draft; of a pair of hanger springs inclining inwardly from their upper ends and having their upper ends supported upon said side springs and their lower ends provided with spring arms, a seat extending rearwardly beyond the rear spring arm and provided with seat supporting bars having lugs hinged to the spring arms of the hanger spring, and a foot rest secured to the seat supporting bars, substantially as and for the purpose set forth.

In testimony whereof I have hereunto signed my name, in the presence of two attesting witnesses, at Syracuse, in the county of Onondaga, in the State of New York, this 7th day of November, 1892.

HORACE S. VAN PATTEN.

Witnesses:
CLARK H. NORTON,
M. BAXTER.